July 4, 1933.  U. NISTRI  1,916,487
PHOTOGRAMMETRIC APPARATUS
Filed July 19, 1930  6 Sheets-Sheet 1

July 4, 1933.   U. NISTRI   1,916,487
PHOTOGRAMMETRIC APPARATUS
Filed July 19, 1930   6 Sheets-Sheet 2

Inventor:
Umberto Nistri
By Alfred Müller
Attorney

July 4, 1933.　　U. NISTRI　　1,916,487
PHOTOGRAMMETRIC APPARATUS
Filed July 19, 1930　　6 Sheets-Sheet 4

Patented July 4, 1933

1,916,487

UNITED STATES PATENT OFFICE

UMBERTO NISTRI, OF ROME, ITALY

PHOTOGRAMMETRIC APPARATUS

Application filed July 19, 1930, Serial No. 469,117, and in Italy July 27, 1929.

The present invention has reference to an apparatus by means of which by using two photographs of a certain tract of land, obtained from two points of known position, and with photographic cameras of which the focal distance is known, and which are disposed with known azimuthal and zenithal directions, allows, by means of finding the coincidence of the points of the projections of the said photographs upon movable screens, to obtain in an easy and rapid manner the coordinates of isolated points or to draw lines of equal level, in order to obtain the representation of the land.

The principle on which the said photogrammetric apparatus is based is already known in photogrammetric practice and can be briefly described as follows:

(a) The two photographs of the same object (i. e. a land tract) obtained with the axes disposed in any position, from land or from aboard an aircraft, are inserted into two optical systems of projection, with the constants of internal orientation (principal distance and principal point) arranged in a position identical to that which they had in respect to the optical system that was used for obtaining the image at the moment of exposure.

(b) The three or four points of the land tract having known co-ordinated and which constitute the basis of the survey, are marked in the space in their real planimetric and altimetric positions so as to represents them in any chosen scale in their real respective positions.

(c) The two projecting apparatuses with the two photographic negatives are directed in respect to these points so as to cause each of them to take up the position corresponding to that which the optical system used for taking the photograph had when the impressions were taken.

Having thus described the method, the apparatus forming the object of the present invention serves to carry out mechanically and in an easy and rapid manner the operation above described, and also to allow of the subsequent graphical tracing on paper of the map of the tract of land which in this way remains definite.

The apparatus includes two separate parts which are as follows:

(1) A projection group with the two optical projection apparatuses and the system of the control devices so as to cause each of them to assume any desired position or orientation in the space.

(2) The delivery group which includes:

(a) The appliances to fix in the space the points having known co-ordinates.

(b) The appliances for the graphic tracing of the image of the land tract on the drawing paper.

In the accompanying drawings, which serve to illustrate a practical embodiment of the photogrammetric apparatus according to the present invention:

The same reference numerals are used in the various figures to indicate the corresponding parts.

Figure 1:
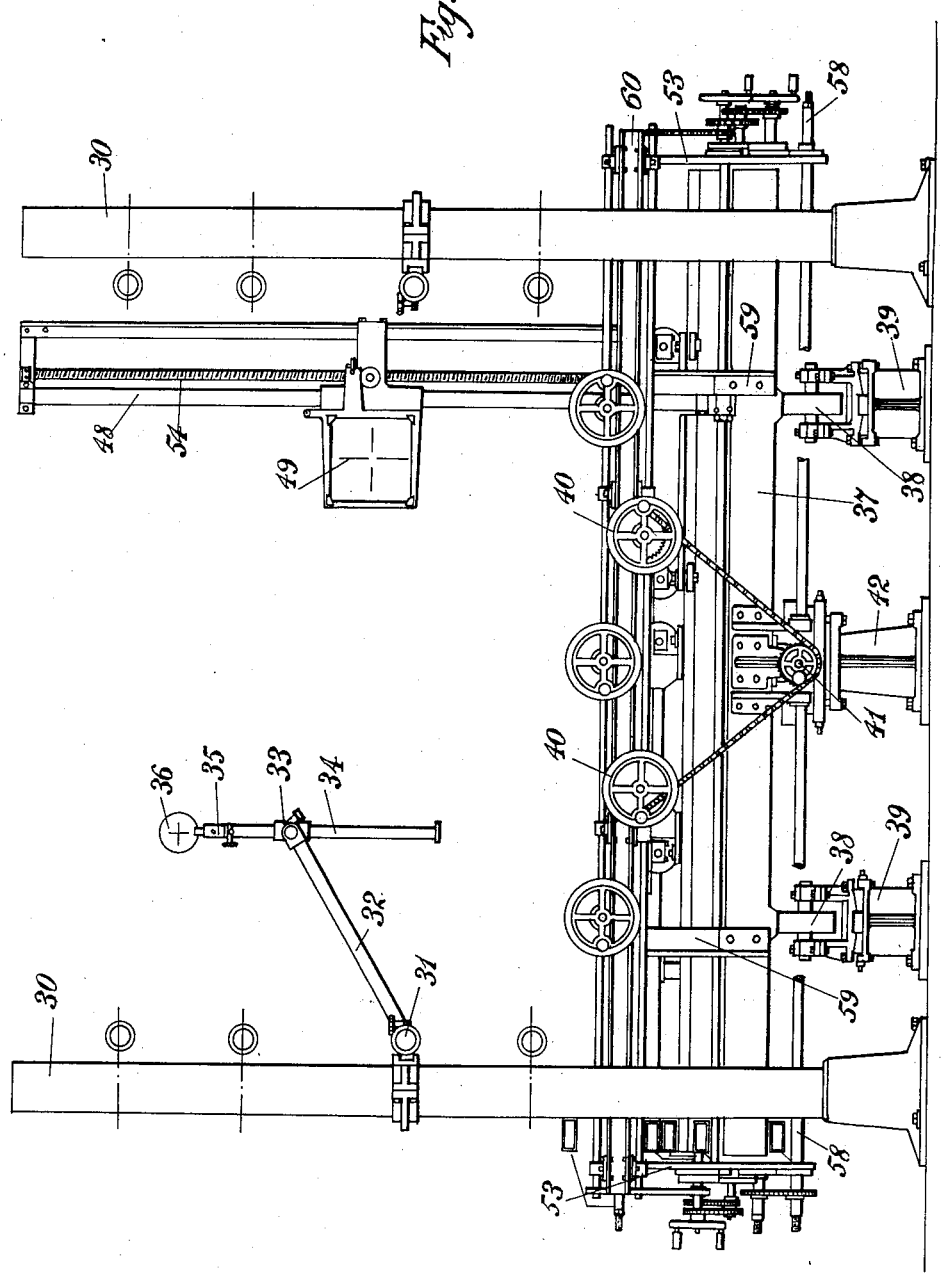
Fig. 1 is a side-elevation of the delivery group mounted on its support.

The projection group is supported on two columns 1 which are vertically disposed on a base plate.

On these two columns, two small trucks 3 are made to slide by means of guides, independent of each other, and symmetrically arranged, each of them controlled by the hand wheels 4, 5 which act by means of gears on the two toothed racks 6.

Each of the said small trucks carries a system composed of a transversal slide 7 on which another small truck 8 controlled by the hand wheel 9 is made to run.

On the small truck 8 another slide 10 is mounted or orthogonally to the first, on which by means of the hand wheel 11 the small truck 12 can be made to slide.

This latter acts as the immediate support of the projection device which consists of a main body which includes the optical system proper, formed of the objective, the focal planes 13, 14 the condenser 15 and the light source 16.

This central body is supported on its front part by a ring fitted with two lateral projections 17 which rest on the vertical fork 18 provided on the front part of the truck 12 thus forming a universal joint the centre of which coincides with the optical centre of the objective, or more precisely with the emerging point of the said joint.

The control body can rotate on itself in its forward part, moving in the ring carrying the projections, and in its back portion rests on a pivot 62 which is inserted in a hole provided coaxially on the prolongation of the principal axis of the optical system.

Figure 6:
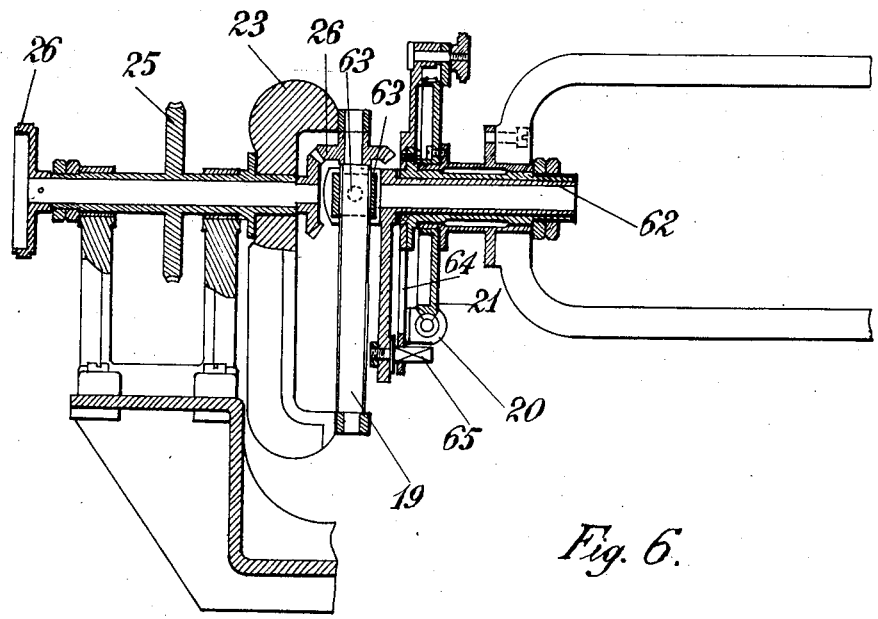
Figs. 6 and 7 are enlarged details of parts shown in Fig. 3.
Figure 7:
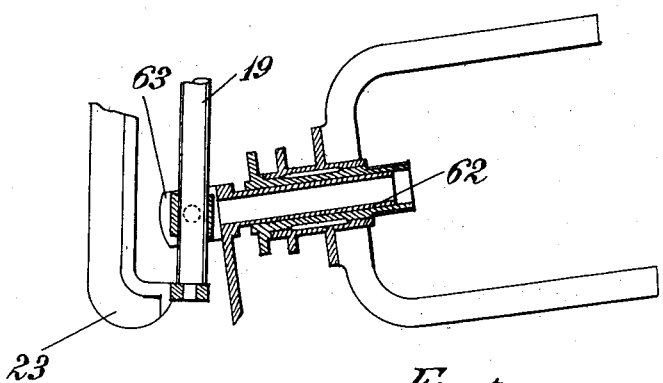

As more clearly shown in Figs. 6 and 7, the pivot 62 terminates in a female screw 63 held by the screw 19. On the female screw is arranged a hand wheel 20 provided with a screw which acts on the spur gear 21 fixed on the central body.

Lastly, the screw is held by a small fork 23 which in its turn is supported by a pivot placed in a normal direction to the rotating plane of the screw 19 and in the position of the drawing on the prolongation of the optical axis.

The hand wheel 24 serves to rotate the spur gear 25 and consequently also the small fork 23 and the screw provided on it. The hand wheel 26 connected with two conical gears serves for the rotation on its axis of the screw 19 which by shifting the female screw 63, causes a corresponding movement of the central body of the optical system to which it is joined by means of the pivot 62.

With the contrivance above described the movements which can be made in each optical system are the following:

(a) Movements in the direction of three orthogonal axes (co-ordinates) by using the three hand wheels 4, 9 and 11.

(b) A rotating movement of the system round its own optical axis by means of the hand wheel 20.

(c) A movement of inclination of the optical axis with pivot on the second nodal point of the objective by means of the hand wheel 26.

(d) A rotating movement round an axis resulting from a plane including this axis and the optical axis in any of its inclinations that it may assume. This movement is caused by the hand wheel 24 which causes the rotation of the screw 19 in a plane which is normal to a line running from the optical centre to the support of the small fork 23. The screw 19 is consequently always in the plane of inclination desired; the other, or mechanical axis which corresponds to 0° inclination of the optical axis, is vertical when dealing with aerial photographs.

The object of the arrangement above described is to obtain by means of rapid and easy movements the coincidence of points on the ground which have co-ordinates already known, and which are materially reproduced in the delivery group with those corresponding in the projection group.

In fact this series of six movements can be subdivided into two separate and distinct groups as follows:

(a) Movements designed to obtain the superposition without deforming the figure.

(b) Movements designed to obtain a given deformation.

The first group of movements includes the two hand wheels 9 and 4 as well as the hand wheel 24; the first two because they shift the apparatus in the precise direction of two co-ordinates, the third because without altering its inclination, it allows of the rotation of the figure round the axis of inclination (zero) which, in other words, is the vertical line running from the centre of the objective glass to the plane of the horizon.

The second group includes the following contrivances: the hand wheel 11 by which the distance, and consequently the size of the image may be varied. The hand wheel 20 which, by rotating the figure round the optical axis deforms the said figure on the horizontal plane when the optical axis does not coincide with the central vertical axis of the system.

The delivery arrangement consists of the two following parts:

(a) the group of the movable screens,
(b) the system for the drawing and for the graphic reproduction of the reconstructed image.

The group of the movable screens is supported by the two columns 30 disposed vertically on the two sides of the system.

Each column carries four movable supports, one for each screen, which are consequently eight in all.

Each support is constructed with a tube 31 which can slide horizontally in a direction perpendicular to a plane of general reference of the system which corresponds to the horizon of the reconstruction of the ground.

Figure 2:
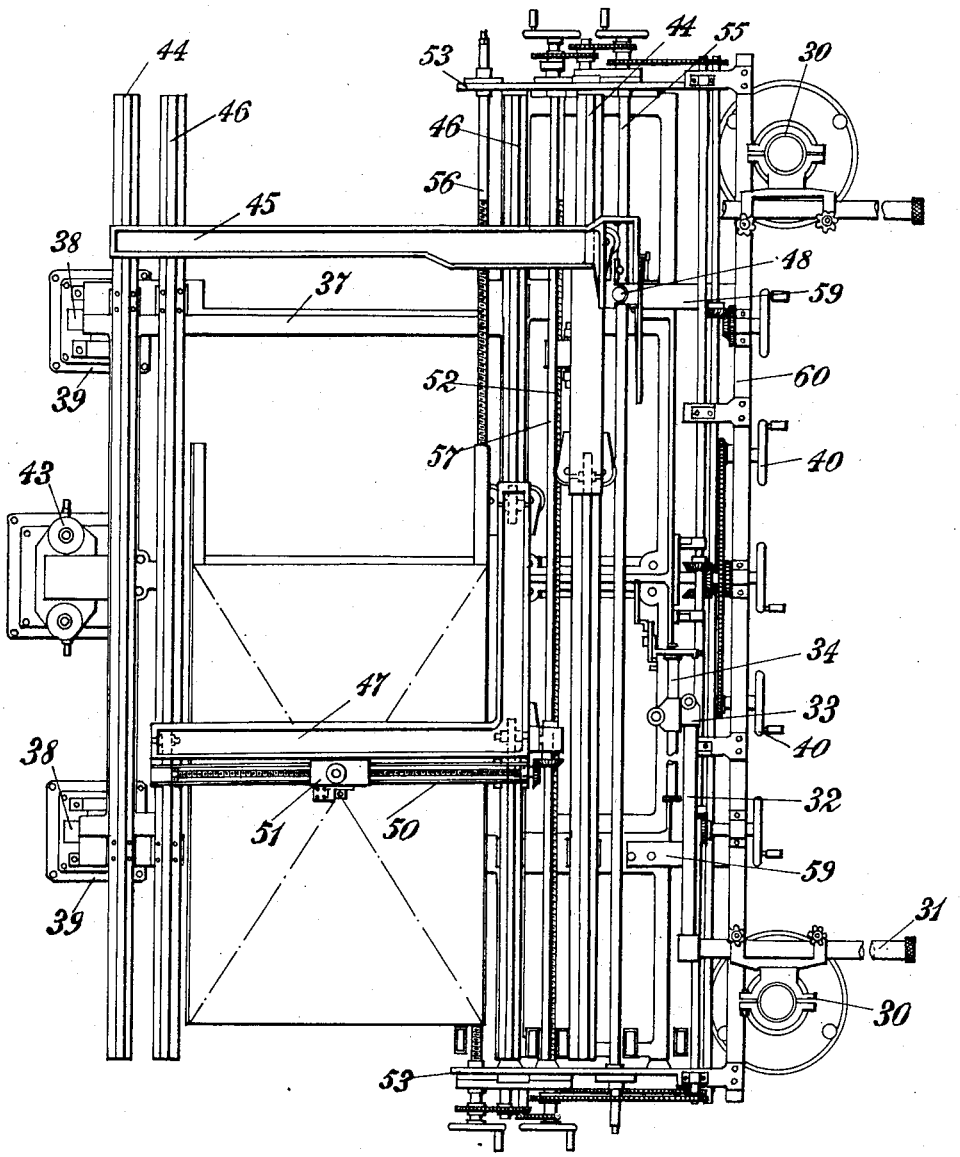
Fig. 2 is a plan view of the device shown in Fig. 1.
Figure 3:
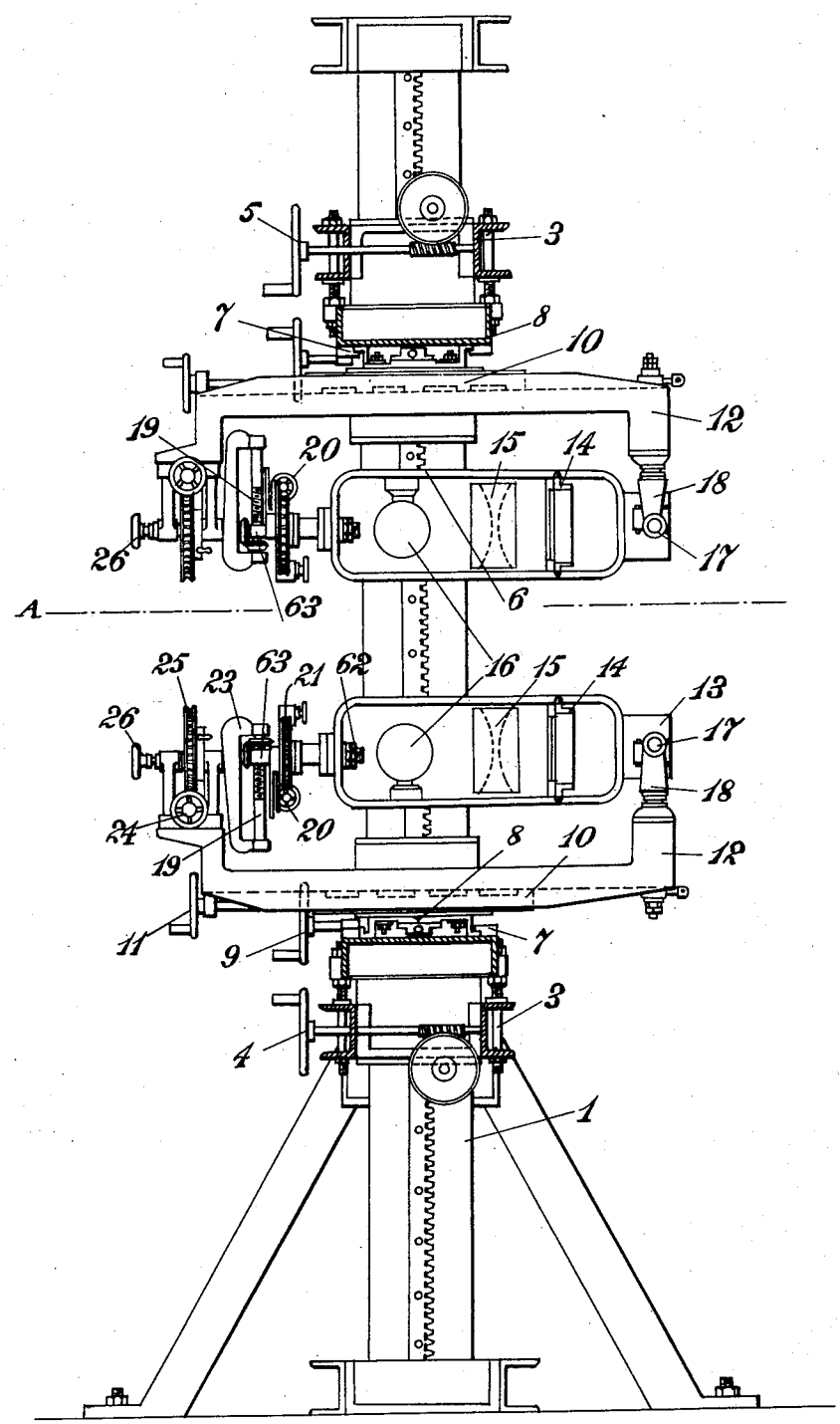
Figs. 3 and 4 are respectively a side elevation and plan view of the projector group.
Figure 4:
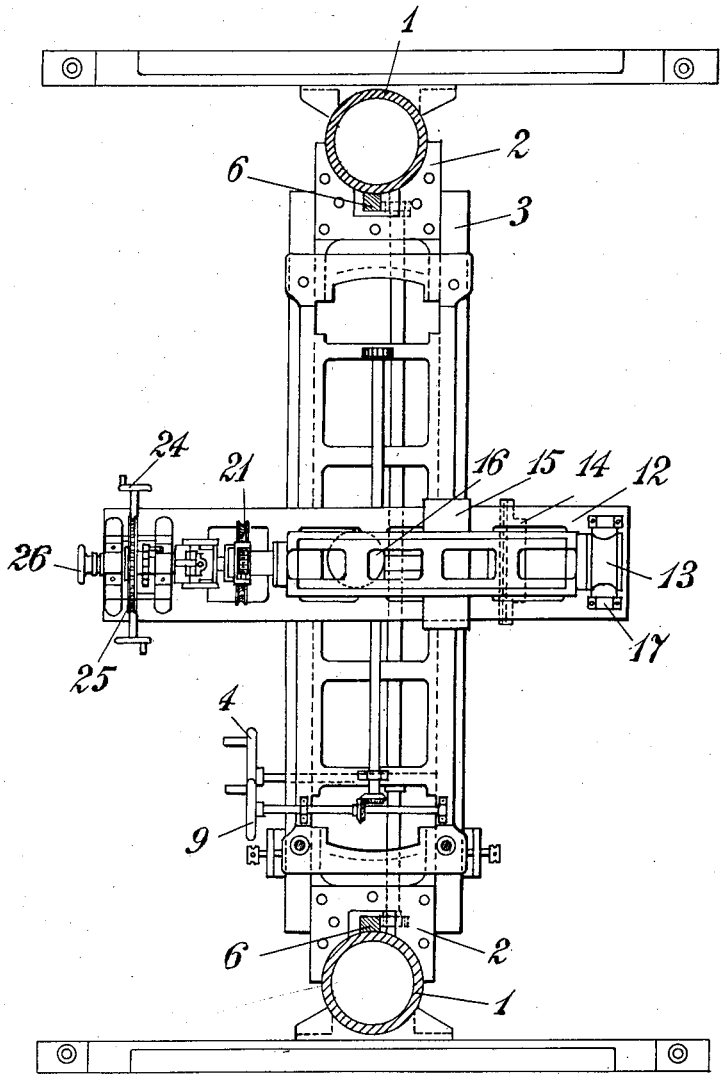

Each tube 31 carries (Fig. 2) at its front end and at right angle, another tube 32 which terminates with a ball joint 33 which allows another tube 34 to rotate in a direction parallel to the plane above said, and to slide along its own axis. At the end of this tube 34 a small bearing 35 is provided which allows of two shifting movements and of one rotating movement so as to allow a small screen 36 (consisting of an emery glass with central hair lines) to assume with small micrometric movements a given position in the space to which it has previously been brought approximately by the movements of the aforesaid supports.

The system for the graphic tracing includes a principal table 37 resting with an adjusted sliding plane on the wheels 38 running on the adjustable supports 39. This table can be moved on the said wheels by means of a hand wheel 40 controlling a screw 41 which acts on a female screw fixed to the central support 42.

A special arrangement of counterpoised side wheels 43 acting on the corresponding two rectified planes, allows of the shifting of the table in the desired direction, the construction of which is normal to the horizontal plane of the reconstruction.

On the table above described, two pairs of guide rails are fitted in a transverse direction to its movement; two of these guides 44 are outside and on these the truck 45 rests and slides, the other two guides 46 are internal, and on these the truck 47 rests and slides.

The two said trucks have a rectified parallel movement on the borders of one of two guides, so as to maintain them parallel to the horizontal plane of the reconstruction.

The truck 45 carries on its front part a vertical rod 48 on which slides a screen frame 49 consisting of an emery glass with centre hair lines, used as collimator.

Figure 5:
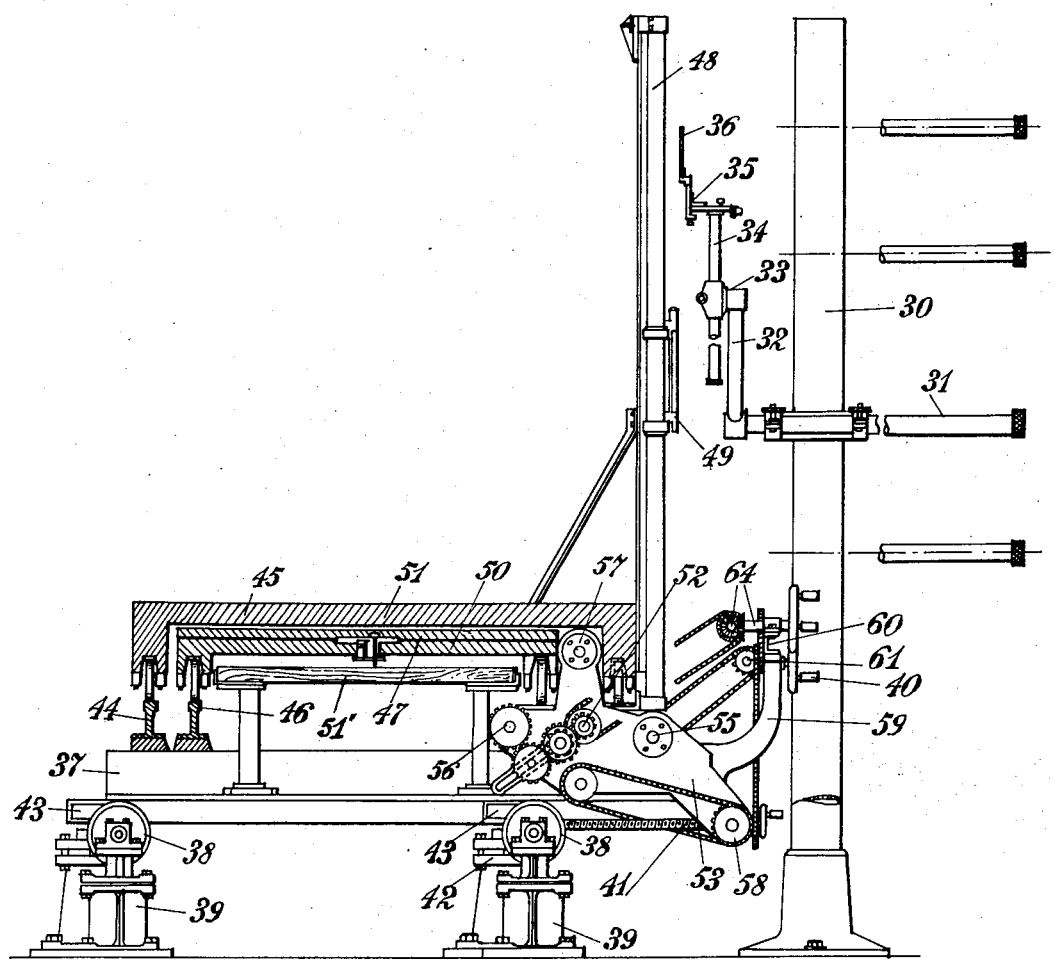
Fig. 5 is a vertical cross-section through the delivery group.

The truck 47 carries horizontally a rod 50 fitted normally to the horizontal plane of the reconstruction, on which slides a truck 51 adapted to carry a pencil which traces the said reconstruction on a sheet of paper laid on the drawing board 51' (Fig. 5).

The transverse movement of the truck 45 in the direction of the principal guide is controlled by a screw 52 supported at the ends on the two plates 53 which also are provided on the principal table.

The vertical movement of the screen frame is equally controlled by a screw 54 (Fig. 1) arranged vertically.

This screw is connected by means of two conical gears to a grooved shaft 55 disposed in a transverse direction, so that when shifting the truck 45 on acount of its transverse movement, the set of conical gears is shifted along the grooved shaft; consequently by acting simultaneously on the screw of the truck and on the grooved shaft, it is possible to move in any of the two directions and with any velocity the truck 45 in a transverse direction, and the screen 49 in a vertical direction.

In the manner above described the cross hair lines on the screen can be made to assume any desired position in the plane appertaining to them and which is the one coinciding with the horizon of the reconstructed ground, by simply acting simultaneously on the two hand wheels.

By shifting back or forward the principal table, it is possible to reach successively other horizon planes by a movement of translation.

The truck 47 by means of a mechanical control can be shifted transversally, while with another gearing similar to the one above described, the truck carrying the pencil is shifted horizontally in a direction normal to the movement of the truck.

The screw 56 of the truck 47 and the grooved shaft 57 are also disposed transversally and in a parallel direction to the truck 45 so that the end of each shaft is projecting on the plane of the supports.

On the two base planes, a suitable system of interchangeable gear is provided, similar to the gear of the screw cutting heads of lathes and which allows the connection in couples of the said shafts, viz; any one of the shafts of the truck 45 with each of the shafts of the truck 47 indifferently.

Lastly, the screw 41 which carries the whole table 37 with a transverse motion, is connected by means of conical gears to the longitudinal shaft 58 lying on the same plane as the shafts mentioned above, so that it may, by means of suitable gear, be connected with any one of the shafts of the truck 47.

On the front part of the principal table 37 (Fig. 5) the brackets 59 are provided which carry a cross member 60 on which are supported the control hand wheels.

These hand wheels control the shafts 61 of the truck 45 and the translation movement of the table 37 and are arranged in such a way so as to allow the operator to place himself in the two side positions thus enabling him to be always in a comfortable position for the observation of the screen.

Each of the two movements of the two trucks and of the table is graduated so as to read the decimals of a millimetre.

The object of the arrangement above described is to enable one to obtain the following results:

(a) To obtain the reconstruction of the land tract, by utilizing the co-ordinates of its known points, with the same index with which the delivery and the drawing are made.

(b) To trace this reconstruction on the drawing with any desired ratio of reduction.

(c) By suitably connecting the shafts it is possible to draw the lines of equal altitude of the ground as well as any vertical sections of the same.

The first result is obtained by shifting the screen which by reason of it graduated movements, can assume the value of the plane co-ordinates of each point, while by shifting the table it can be made to assume the positions corresponding to the single differences of level. Afterwards, the small screens, one at a time, are brought to the position of the screen, 49, in which position they represent the position of the individual trigonometric points.

Lastly, when the coincidence of the same points on the two positions has been obtained with the single screens, and having thus obtained the real re-construction of the land tract photographed within the given space, the small screens are withdrawn and the delivery or drawing stage is commenced by moving the hair lines of the principal screen 49 along the trigonometric points in the position of coincidence of the two images, as well as any other point on the land tract.

The movements of the screen, by means of the described connections of the shafts, as stated above, are repeated by the truck carrying the pencil on the horizontal plane at the desired ratio of reduction, thus obtaining the result of obtaining the delivery of the real image considerably magnified, while the actual graphic drawing is obtained with a reduction of scale.

Lastly, as the various connections of the control shafts of two trucks and of the table can be made at will, the following results can be obtained:

(a) By coupling the two shafts 52, 55 of the truck 45 with the other two 56, 57 of the truck 47 either in one way or another, the inversion of the two plane co-ordinates is obtained, viz; the co-ordinates of the reconstruction with the graphic co-ordinates of the drawing.

(b) By coupling the shaft 41 which serves to move the table 57 with one of the shafts of the truck carrying the pencil, and the other with one of the shafts of the truck carrying the screen frame, the profile or section of the ground in the direction of any one of the co-ordinates is obtained.

I claim:

1. Photogrammetric apparatus for tracing the drawing corresponding to a land tract represented by two photographs, comprising in combination two projecting apparatus having their axes disposed in the same relative direction as the axes of the optical system used for obtaining the impression of the image, means for supporting and controlling said optical systems consisting of two vertical columns, two guides fixed on each of said columns, two trucks symmetrically disposed to run independently on said guides, handwheels for controlling said trucks, a transverse slide carried on each of said trucks, a truck slidable on each of said transverse slides, a slide mounted orthogonally to each of said transverse slides and carried by each of said trucks running on said transverse slides, a projection device mounted on each of said two orthogonal slides, enabling the universal and independent movement of each of the two systems of projection in the direction of the three orthogonal co-ordinate axes in space, a rotating movement about the optical axis, a movement of inclination of the optical axis and a rotating movement about an axis determined by the plane comprising the said axis and the optical axis in any inclination it may assume; a drawing system for drawing the map corresponding to the two photographs and comprising a number of small screens, each fitted with translucent glass and hair lines, two vertical columns disposed at the sides of the system, each carrying four of the said small screens by means of articulated rods, controlled with micrometrical devices, a drawing apparatus comprising a movably mounted main drawing board, two trucks disposed to move in the transverse direction to the movement of said drawing board, a vertical rod carried in the fore part on one of said trucks, a principal screen slidably carried on said rod, a second rod mounted on the other truck, disposed normally to the plane of the horizon of the reconstruction, and a truck adapted to carry a pencil, said last mentioned truck being slidably mounted on said second rod.

2. A photogrammetric apparatus according to claim 1, in which the small or secondary screens are provided to successively assume the position of the principal screen connected to the drawing system for the tracing of the map, and fastening devices permitting said screens to be fixed in space in the relative position of the known points on the ground, the coordinates of which are set by means of said principal screen.

In testimony whereof I have affixed my signature this seventh day of July, 1930.

UMBERTO NISTRI.